Figure 1:
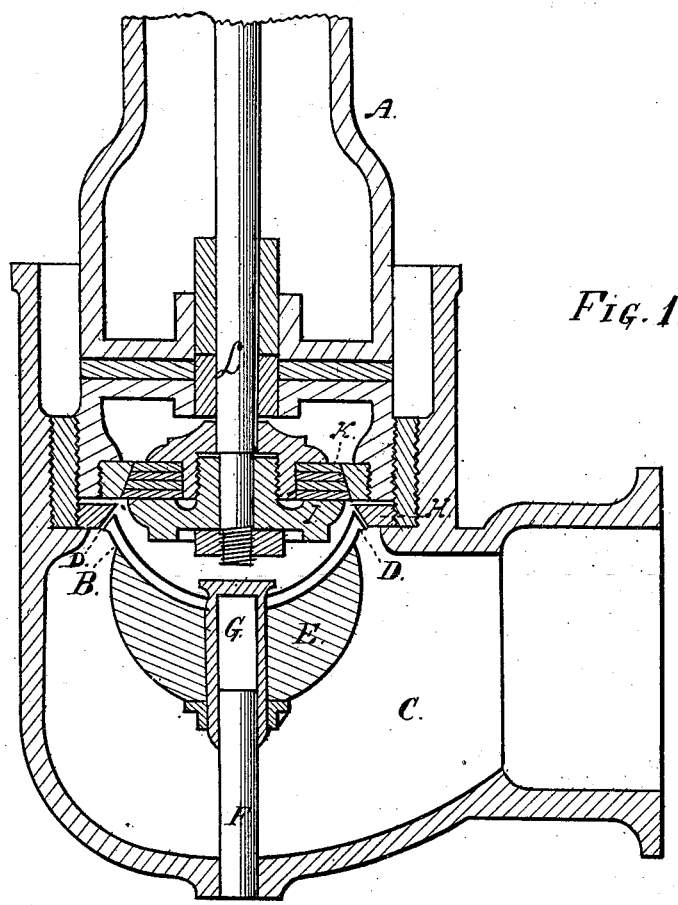

J. W. ROHN.
Hydrant-Valve.

No. 196,540. Patented Oct. 30, 1877.

WITNESSES: INVENTOR:

UNITED STATES PATENT OFFICE.

JULIUS W. ROHN, OF MILWAUKEE, WISCONSIN.

IMPROVEMENT IN HYDRANT-VALVES.

Specification forming part of Letters Patent No. 196,540, dated October 30, 1877; application filed September 3, 1877.

*To all whom it may concern:*

Be it known that I, JULIUS W. ROHN, of Milwaukee, in the county of Milwaukee, in the State of Wisconsin, have invented certain Improvements in Hydrant-Valves, of which the following is a specification:

The object of my invention is to provide a valve for a hydrant that can be taken out for repairs without disturbing the water-pipes.

In the drawing which forms part of this specification, the figure is a sectional view of my invention.

In the drawing, A is the hydrant; B, the valve, working upward in the valve-chamber C; D, the valve-seat. E is a cork, attached to the valve for a float, and is placed around the stem of the same, which will keep the valve up to its seat. F is a standard projecting upward from the bottom of the valve-chamber, which enters the orifice G in the valve, and keeps the same steady in its place, the valve sliding up and down on the standard F. H is a ring screwed into the hydrant, forming a valve-seat, D. I is an upper valve, fitting upon its valve-seat K. L is the stem of valve I, with a screw on its top, with which it is screwed down, and, striking on the valve B, forces the same down and opens it, and when screwed back again the float E will raise the valve B and close it.

Whenever it is necessary to repair the upper valve the hydrant can be unscrewed and taken off, so that everything can be examined without disturbing the water-pipes; and whenever it is necessary to repair or adjust the lower valve, shut the water off from the same and unscrew the ring H, and the valve B can be taken out.

What I claim as new, and desire to secure by Letters Patent, is—

Hydrant-valve B, with its float E, ring H, and standard F, arranged substantially as described.

JULIUS W. ROHN.

Witnesses:
J. B. SMITH,
OLE O. STORLE.